United States Patent [19]

Mao et al.

[11] 4,147,678

[45] Apr. 3, 1979

[54] FLAME-RETARDANT POLYURETHANE COMPOSITIONS

[75] Inventors: Chung-Ling Mao, Sandy Hook; Walter Nudenberg, Newtown, both of Conn.

[73] Assignee: Uniroyal, Inc., New York, N.Y.

[21] Appl. No.: 796,585

[22] Filed: May 13, 1977

[51] Int. Cl.² .............................................. C08K 3/38
[52] U.S. Cl. .................... 260/28.5 R; 260/45.75 B; 260/45.7 R; 260/45.8 NT; 521/115; 521/906
[58] Field of Search ................... 260/28.5 R, 2.5 AJ, 260/45.8 NT, 45.7 RL, 45.75 B

[56] References Cited

U.S. PATENT DOCUMENTS

| | | | |
|---|---|---|---|
| 3,211,676 | 10/1965 | Spencer | 260/45.8 NT |
| 3,651,803 | 3/1972 | Bechtold | 260/45.8 NT |
| 3,897,372 | 7/1975 | Kehr et al. | 260/2.5 AJ |

*Primary Examiner*—V. P. Hoke
*Attorney, Agent, or Firm*—Anthony Lagani, Jr.

[57] ABSTRACT

This inventon relates to flame-retarded cross-linked elastomer compositions obtained from an elastomeric polyurethane prepolymer; an organic fire-retardant additive containing chlorine and/or bromine; a compound of antimony; and a hexaalkoxymethyl melamine. These new compositions are self-extinguishing as well as non-dripping.

15 Claims, No Drawings

FLAME-RETARDANT POLYURETHANE COMPOSITIONS

BACKGROUND OF THE INVENTION

Polyurethanes which are flame-retardant are highly desired and required for many applications especially as the pressure for flame-retarded products increases in the legislative area. In general, imparting a specified level of flame-retardancy to polyurethane polymers can be accomplished with relative ease by compounding with flame-retardant compounds after the polycondensation reaction leading to the formation of the polymer. Flame-retardants, classified by function, fall logically into three major classes: reactive, additive and synergistic.

The most widely used flame-retardants for polyurethanes are the additive type such as the halogenated aliphatic hydrocarbons in conjunction with synergists such as antimony compounds; see, for example, Modern Plastics Encyclopedia, p. 228, 1974-1975. The synergist enhances the effectiveness of the flame-retardant and thereby provides higher levels of flame-retardance at moderate flame retardant use levels without significantly compromising other desirable physical properties; see Lyons, J. W., "The Chemistry & Uses of Fire-Retardants," p. 364, 1970; John Wiley & Sons, Inc.

Flexible polyurethanes, both solid and foamed, are more difficult to flame-retard while maintaining an acceptable balance of properties. The flexible polyurethane molecules are longer and more delicate than the rigid molecules and are therefore more sensitive to the loss of key physical properties with minor changes in composition. The flexible molecules are also more flammable than the molecules of rigid polyurethanes because they contain a higher percentage of flammable components such as aliphatic polyethers, 70% versus 50% or less for the rigid polyurethanes. An additional drawback of flame-retardant flexible polyurethanes is the phenomenon of dripping of the melted polyurethane polymer while it is burning during and shortly after ignition. The flaming droplets may spread the flame beyond the site of initial ignition. Indeed, in some compositions, the formulation would be self-extinguishing except for the fact that the dripping away of the melted polymer constantly exposes a fresh new surface of polymer to the fire, and the fire continues to progress.

SUMMARY OF THE INVENTION

It has surprisingly been found that a dripless, fire-retardant, cross-linked polyurethane elastomer may be prepared from a cross-linkable polyurethane prepolymer by compounding the prepolymer with (1) a halogen containing compound, (2) an antimony compound and (3) a hexaalkoxy methyl melamine and subsequently preparing the cross-linked polymer by a polycondensation reaction.

The preferred antimony compound is antimony trioxide and the preferred halogens are chlorine and bromine.

DETAILED DESCRIPTION

This invention relates to flame-resistant polyurethane elastomers which are both self-extinguishing and non-dripping. These elastomers are made by incorporating a low molecular weight additive which is used in conjunction with a flame-retardant mixture composed of a halogenated hydrocarbyl compound and a metallic compound into the prepolymer before the occurrence of the polycondensation reaction which leads to the formation of the base elastomeric polyurethane. The said additive is selected from the class of compounds known as the hexaalkoxymethyl melamines having the following formula:

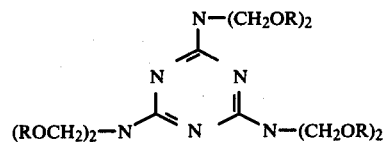

wherein R is a $C_1$-$C_5$ straight or branched chain alkyl group.

Examples of the substituted melamines which are operative in this invention are:
hexamethoxymethylmelamine,
hexaethoxymethylmelamine,
hexapropoxymethylmelamine,
hexabutoxymethylmelamine,
hexaisobutoxymethylmelamine and
hexapentoxymethylmelamine.

The preferred polyurethane elastomers which are operable in this invention are those which are prepared utilizing the prepolymer technique. The prepolymer is formed by reacting an organic polyhydroxyl compound with an organic polyisocyanate in the presence of a catalyst and low molecular weight organic polyhydroxyl chain extender to form a hydroxyl-terminated prepolymer. The prepolymer is then treated with additional polyisocyanate and heated at moderate temperatures to effect a "cure."

The polyhydroxyl compounds which may be employed in this invention are those substances having two or more active hydrogen atoms as determined by the Zerewitinoff method, e.g., the polyalkylene polyols which will react with organic polyfunctional isocyanates to give urethane polymers. These polyalkylene polyols, typically having a molecular weight of about 180 to 8000, may include polyesters, polyethers, polyisocyanate modified polyesters, polyisocyanate modified polyester amides, alkylene glycols, polymercaptans, polyamines, polyisocyanate modified alkylene glycols, etc. It will be understood that these polyalkylene polyols may have active primary or secondary hydroxyl groups. The polyalkylene polyol may be a hydroxyl-containing polyether or polyester including fatty acid glycerides. Polyesters, which are a preferred type of polyalkylene polyol, may be obtained by esterification condensation reaction of, e.g., an aliphatic dibasic carboxylic acid with a glycol or a triol or mixture thereof in proportions such that the resultant polyesters may contain predominantly terminal hydroxyl groups. Dibasic carboxylic acids suitable for preparing polyesters may include aliphatic and aromatic acids such as adipic acid, fumaric acid, sebacic acid, phthalic acid; suitable alcohols include ethylene glycols, diethylene glycols, trimethylol propane, etc. The fatty acid glycerides may include those having a hydroxyl number of at least about 50 such as castor oil, hydrogenated castor oil, or blown natural oils.

Examples of useful branch chain polyether polyols containing a plurality of functional hydroxyl terminal groups are the reaction products of glycerol, trimethylol propane, pentaerythritol, 1,2,6-hexane triol, phloroglucinol, trimethylol benzene, trimethylol phenol, styrene-vinyl alcohol copolymer, sucrose, sorbitol and similar polyhydric materials reacted with glycols and the like such as propylene glycol, butylene glycol, mixtures of ethylene and propylene glycol and the like in the presence of catalysts with removal of water. They also may be reacted with alkylene oxides such as propylene oxide, butylene oxide, mixtures of ethylene oxide and propylene oxide and the like. Mixtures of the monomers forming the polyether polyols as well as the mixtures of the branched chain polyether polyols themselves may be used. The branch chain polyether polyols have at least 3 functional hydroxyl radicals but may have up to 8 or more functional hydroxyl radicals.

Examples of linear or substantially linear polyether polyols are those polyalkylene ether glycols derived from alkylene oxides, glycols, heterocyclic ethers and other materials by polymerization, copolymerization and the like. For example, tetrahydrofuran may be polymerized in the presence of catalytic amounts of fluoro sulfonic acid to make a polytetramethylene ether glycol having the formula: $HO(-CH_2CH_2CH_2CH_2O-)_xH$ where x is an integer. Ethylene oxide-propylene oxide mixtures, propylene oxide and the like may be used to make other polyalkylene ether glycols. Glycols may be polymerized in the presence of mineral acid, sulfonic acid of fuller's earth. Still other methods well known to the art may be used in the preparation of polyalkylene ether glycols.

These linear polyether polyols may be represented by the formula: $HO(-R-O-)_xH$, where R is an alkylene or aryl alkylene group and where x is an integer. Moreover, R can be a mixture of alkylene groups, for example, alternating groups or blocks of ethylene and propylene radicals, i.e., a polyethylene-propylene ether glycol. Examples of substantially linear polyalkylene ether glycols are polyethylenepropylene ether glycol, polyneopentylene ether glycol, polyhexamethylene ether glycol, poly 4-phenyl hexamethylene ether glycol, poly 1,5-heptamethylene ether glycol and the like. To provide for water resistance, the polyethers should have at least three carbon atoms between oxygen (ether) linkages. However, some of the carbon chains can consist of 2 carbon atoms, so long as there is a predominating number of carbon chains having 3 or more carbon atoms. The average molecular weight of these polyethers may vary from about 180 to about 8000 or more.

The low molecular weight polyhydroxyl compound chain extenders used in this invention are exemplified by those compounds having at least two free hydroxyl groups with a molecular weight ranging from 50 to 500 such as ethylene glycol, propylene glycol, 1,3-butanediol, 1,4-butanediol, butene diol, butyne diol, xylylene glycols, amylene glycols, bis($\beta$-hydroxyethyl)aniline, bis(hydroxypropyl)aniline, 1,4-phenylene-bis($\beta$-hydroxyethyl ether), 1,3-phenylene-bis($\beta$-hydroxyethyl ether), hexane diol, thiodiglycol and the like and mixtures thereof.

Any suitable organic polyisocyanate may be used in the process of this invention including aromatic, aliphatic and heterocyclic polyisocyanates, for example, ethylene diisocyanate, ethylidene diisocyanate, propylene-1,2-diisocyanate, cyclohexylene-1,2-diisocyanate, m-phenylene diisocyanate, 2,4-tolylene diisocyanate, 2,6-tolylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p"-triphenylmethane triisocyanate, 1,8-naphthalene diisocyanate, furfurylidene diisocyanate or polyisocyanates in a blocked or inactive form such as the bis-phenyl carbamates of 2,4- or 2,6-tolylene diisocyanate, p,p'-diphenylmethane diisocyanate, p-phenylene diisocyanate, 1,5-naphthalene diisocyanate and the like. Triisocyanates typically obtained by the reaction of three moles of an arylene diisocyanate with one mole of a triol, for example, the reaction product formed from three moles of tolylene diisocyanate and one mole of hexanetriol or of trimethylol propane, may be employed. A preferred polyisocyanate is the mixture of 80% 2,4-tolylene diisocyanate and 20% 2,6-tolylene diisocyanate.

The term "polyurethane prepolymer" as used in the specification and claims means the aforedescribed low molecular weight polyurethane compositions which can be chain extended and cross-linked by further reaction with a polyisocyanate. These low molecular weight polymers are generally liquid at room temperature.

In some cases, it may be desirable to increase the rate of reaction of the polyhydroxyl compound with the polyisocyanate. This can be accomplished by the use of catalysts, such as, for example, N-ethyl-morpholine, triethylenediamine, dimethylbenzylamine, N,N-diisopropanol aniline, dimethyl stearyl amine, N,N'-endoethylene piperazine, and the like and mixtures thereof, as well as metal catalysts such as di(phenylmercuric)-dodecenyl succinate, dibutyltin-di-2-ethyl hexoate, nickel acetylacetonate, stannous octoate, stannous oleate, cobalt naphthenate, di-n-butyltin dilaurate, dibutyltin diacetate and the like, and mixtures thereof. Some of these compounds promote the rate of reaction between polyhydroxyl compounds and polyisocyanates at elevated temperatures but may have little or no effect at room temperature.

The organic, halogen-containing fire-retardants utilized in this invention are the well-known, widely recognized fire-retardant additives for polymers including the chlorine and/or bromine-containing compounds of aliphatic, aromatic, alicyclic or mixed types having a halogen content typically in the range of 35–80% by weight. The halogen compounds selected should be substantially nonvolatile, stable and non-reactive toward the polyurethane and any auxiliary ingredients at the processing (curing) temperatures. The halogen compound may optionally be polymeric such as, for example, a polyvinyl halide, neoprene, or chlorinated polyethylene.

The terms stable and non-reactive as used in the specification and claims with respect to the halogen containing compounds means that the compounds will not decompose or react with other constituents of the polyurethane prepolymer composition or isocyanates under normal use conditions of the finished product or the intermediate blends.

Examples of non-polymeric chlorine and bromine compounds useful in the practice of this invention include chlorinated paraffins, marketed under a variety of trademarks such as "Chlorowax," "Unichlor" and "Cereclor," tetrabromoethane, hexabromobutene-2, methyl pentachlorostearate, halogenated aromatics such as hexa-, octa-, and decabromobiphenyls, decabromodiphenyl oxide, hexabromobenzene, tribromophenol, tetrabromosalicylanilide, tetra(pentabromophenoxy) silane, dibromopropyl chlorobenzoate, dibromopropyl maleate, tetrachloro- and tetrabromophthalic anhydrides, tetrachloro- and tetrabromobisphenol A and their bishydroxypropyl derivatives, halogenated cycloaliphatics, such as hexabromocyclododecane, pentabromochlorocyclohexane, bis(cyclohexenyl)ethylene hexabromide, hexachlorocyclopentadiene (HCCPD) and its derivatives (typically Diels-Alder adducts with normal or cyclic dienes or olefins and including, for example, chlorendic anhydride, dimethyl chlorendate, diallyl chlorendate, "Cloran," "Dechlorane 602," "Dechlorane 25," perchloropentacyclodecane, and HCCPD adducts with furan, benzoquinone, 5-vinyl-2-norbornene, cyclooctadiene, pentadiene and the like).

To keep the amount of halogen-containing compound to a minimum and thereby preserve the physical properties of the substrate, it is essential to incorporate a synergist such as a metallic compound wherein the metal is selected from the group consisting of antimony, arsenic and bismuth. Antimony oxide is the antimony compound that is presently preferred for use in the present invention. However, many antimony compounds are suitable. Suitable antimony compounds include the sulfides of antimony, salts of the alkali metals of Group I of the Periodic Table, antimony salts of organic acids and their pentavalent derivatives and the esters of antimonius acids and their pentavalent derivatives. It is convenient to sue sodium antimonite or potassium antimonite when it is desired to use an alkali metal salt of the antimony for compositions of this invention. U.S. Pat. No. 2,996,528 discloses suitable antimony salts of organic acids and their pentavalent derivatives, and this disclosure is incorporated herein by reference. Compounds of this class include antimony butyrate, antimony valerate, antimony caproate, antimony heptylate, antimony caprylate, antimony pelargonate, antimony caprate, antimony cinnamate, antimony anisate, and their pentavalent dihalide derivatives. Likewise, the esters of antimonius acids and their pentavalent derivatives are disclosed in U.S. Pat. No. 2,993,924 (this disclosure is incorporated herein by reference) such as tris(n-octyl) antimonite, tris(2-ethylhexyl) antimonite, tribenzyl antimonite, tris(beta-chloroethyl) antimonite, tris(beta-chloropropyl) antimonite, tris(beta-chlorobutyl) antimonite, and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed, in particular the oxides of arsenic and bismuth.

The preferred method of preparation of the self-extinguishing, non-dripping polyurethane elastomeric compositions of this invention is to react a polyhydroxyl compound with a polyisocyanate in the presence of a catalyst and a polyol chain extender to form an hydroxyl-terminated prepolymer. To this polymer are added a halogen-containing organic compound such as chlorinated aliphatic hydrocarbon, a synergist such as antimony trioxide, an hexaalkoxymethylmelamine such as hexamethyloxymethylmelamine and finally a polyisocyanate. After mixing, the compounded polyurethane is "cured" by heating at an elevated temperature of from 250° to 350° F. for about five to twenty minutes. While the foregoing is the preferred method, this invention does not require the use of a hydroxyl-terminated prepolymer or the mixing of the additives with such a prepolymer. All that is required is that the claimed compositions be formed by any suitable method.

The amount of the melamine compound to be used depends upon the amount of the final polyurethane polymer and is in the range of about 3 to about 40 parts by weight per 100 parts by weight of polymer, with a preferred range of about 10 to about 20 parts. The amount of halogen-containing compound will vary from 10 to 50 parts by weight per 100 parts by weight of polymer, with a preferred range of 15 to 30 parts by weight. The amount of synergist will generally vary between about 1 to about 10 parts by weight per 100 parts by weight of polymer with a preferred range of about 2 to about 10 parts by weight. Expressed in terms of the weight ratio of polymer to halogen compound to synergist to melamine compound, the ratios will vary from 50:5:1:1 to 10:5:1:3 with a preferred weight ratio of 28:4:1:2.

The following examples, in which all quantities are expressed by weight unless otherwise indicated, will serve to illustrate the practice of the invention in more detail.

EXAMPLE I

This example demonstrates the procedure for the preparation of a conventional hydroxyl-terminated prepolymer of this invention using the proportions shown in Table I. The components of the said prepolymer were mixed at room temperature in the order shown in Table I.

Table I.

| | | |
|---|---|---|
| CP 4701[a] | 330.0 | parts |
| 1,4-butanediol | 49.5 | " |
| Isonol C-100[b] | 58.0 | " |
| Catalyst[c] | 4.5 | " |
| TDI[d] | 30.0 | " |

[a]Poly (oxypropylene) glycol triol from Dow Chemical Company. Molecular weight about 4500, made from propylene oxide and endcapped with 20-80% ethylene oxide.
[b]N,N-diisopropanol aniline (from Upjohn Chemical Co.)
[c]Di-(phenylmercuric) dodecenyl succinate from Tenneco Chemical Company.
[d]Toluene diisocyanate (80/20 mixture of 2,4 and 2,6 tolylene diisocyanates).

EXAMPLE II

This example demonstrates a preferred embodiment of the invention using the proportions shown in Table II. The ingredients were incorporated into the prepolymer of Example I in the order listed and with rapid stirring. The final mixture was then degassed under vacuum for two minutes and poured into an open top 12"×12"×0.25" Teflon (trademark) coated mold. The mold was then closed and the cast polyurethane composition was cured in a heated hydraulic press using contact pressure for about 10 minutes at 300° F. All test samples were died out from the cured, cast sheet and tested according to the procedures specified. The flame-retardant properties, burning time in seconds, were measured following the procedure of Section 18.65—"Flame Test of Conveyor Belting and Hose;" Part 18 of Title 30—Code of Federal Regulations, Chapter I—Bureau of Mines. In this procedure, the burning time was measured after removal of the Bunsen burner.

Table II

| Components | |
|---|---|
| Prepolymer of Example I | 80.0 |
| Dechlorane 602[a] | 20.0 |
| Cymel 301[b] | 10.0 |
| Antimony trioxide | 5.0 |

Table II-continued

| Components | |
|---|---|
| TDI[c] | 24.0 |

[a] A cycloaliphatic chloride (trademark - Hooker Chemical Corp.); m. pt. = 290–293° C.; density (gms/cc) at 25° C. = 2.0; chlorine content = 69.4%.
[b] Hexamethoxymethylmelamine (American Cyanamid Corp.).
[c] Toluene diisocyanate (80/20 mixture of 2,4 and 2,6 tolylene diisocyanates).

Table III

Physical Properties and Flame-Retardance

| | |
|---|---|
| Durometer, Shore A[1] | 85 |
| Stress at 100% Elongation, psi[2] | 565 |
| Tensile strength, psi[2] | 2150 |
| Elongation, %[2] | 425 |
| Tear strength (Die "C"), psi[3] | 325 |
| Burning time, seconds[4] | 5-15 (non-dripping) |

[1] ASTM D2240-68.
[2] ASTM D412.
[3] Following the procedure of ASTM 624–54 (reapproved 1970). The two legs of the sample were put into the jaws of a Scott model L tester and elongated at a jaw separation rate of 20"/min. until torn apart. The force required to accomplish this was recorded.
[4] A blue Bunsen flame 3 inches in height was applied to the free end of the test sample for one minute in still air. After removal of the flame, the duration of the flame was measured. The time spread is the minimum time and maximum time for self-extinction of four (4) test samples.

It will be noted that the flame-retardant mixture consisting of a halogen-containing organic compound, antimony trioxide and hexamethoxymethylmelamine when incorporated into a conventional flexible polyurethane elastomer not only makes this elastomer self-extinguishing but also non-dripping. The non-dripping characteristic is totally unexpected. The superior flame-retardant properties and good balance of physical properties and the low cost makes these polyurethanes prime candidates for conveyor belts especially for the coal industry, where flaming drip poses a hazard as a source of fire second only to the instantaneous combustion of coal.

EXAMPLE III

Example II was repeated using three different chlorinated hydrocarbons in order to demonstrate the effect of structure of these compounds on both the physical properties and flame-retardant properties of a conventional polyurethane elastomer.

Table IV

| Stock Code | A | B | C | D | E |
|---|---|---|---|---|---|
| Prepolymer of Example I | 80 | 80 | 80 | 80 | 80 |
| Cymel 301 | 10 | 10 | 10 | — | — |
| Antimony trioxide | 5 | 5 | 5 | 5 | — |
| Chlorowax-70[1] | 20 | — | — | 20 | — |
| RIS[2] | — | 20 | — | — | — |
| ZOR[3] | — | — | 20 | — | — |
| TDI | 24 | 24 | 24 | 24 | 24 |

[1] Chlorinated paraffin containing 70% chlorine by weight; Diamond Shamrock Corp.
[2] 2,2',3,3',4,4',5,5',7,7,7',7',-dodecachlore-1,1',2,2',5,5',6,6',-octahydro-2,5,2',5'-dimethanobiphenyl.
[3] 6-(1',4',5',6',7',7'-hexachloronorborn-5'-en-2'yl)-1,2,3,4,10,10-hexachloro-1,4,4a,5,6,7,8,8a-octahydro-1,4:5,8-dimethanonaphthalene.

The physical properties and burning characteristics of the five formulations are given in Table V below. The preparation and testing were the same as in Example II.

Table V

| Stock Code (from Table IV) Property | A | B | C | D | E |
|---|---|---|---|---|---|
| Durometer, Shore A | 67 | 72 | 73 | — | 80 |
| Stress at 100% Elongation, psi | 440 | 410 | 445 | — | 825 |
| Tensile Strength, psi | 2600 | 2145 | 2510 | — | 3000 |
| Elongation, % | 600 | 580 | 590 | — | 425 |
| Tear Strength (Die "C"), psi | 285 | 305 | 285 | — | 475 |
| Burning time, seconds[a] | 10-30 | 5-20 | 30-50 | [b] | [c] |

[a] Burning time was measured following the same procedure as in Example II.
[b] This stock, in the absence of the melamine compound of this invention, dripped.
[c] This stock gave copious flaming drips (melted).

It is quite apparent that 10 parts of the melamine compound (codes A, B and C) exert a powerful flame-retardant effect when used in conjunction with a halogenated hydrocarbon and antimony trioxide. The melamine compound, in an amount of 10 parts per 100 parts of the prepolymer, gave formulations that were not only self-extinguishing but also non-dripping along with a good balance of physical properties.

EXAMPLE IV

In order to demonstrate the necessity for all three components of the fire-retardants of this invention compositions were prepared in which one of the components was not incorporated into the composition. The results are shown in Table VI.

Table VI

| | Composition (grams) | | | | |
|---|---|---|---|---|---|
| Component | 1 | 2 | 3 | 4 | 5 |
| Prepolymer of Example I | 80 | 80 | 80 | 80 | 80 |
| Triacetylmelamine | 20 | 20 | — | — | — |
| RIS | — | — | 20 | 20 | — |
| Chlorowax-70 | — | — | — | — | 20 |
| $Sb_2O_3$ | 0 | 5 | 0 | 5 | 0 |
| TDI | 24 | 24 | 24 | 24 | 24 |
| U.S. Bureau of Mines Test | Burns, Drips | Burns, Drips | Burns, Drips | Burns, Drips | Burns, Drips |

It is evident from Table VI that if any one of the three fire-retardant components are left out of the blend the resulting polymer will burn and drip.

EXAMPLE V

This example demonstrates the application of flame-retardant polyurethane compositions of this invention to a fabric reinforced substrate such as a conveyor belt construction.

Samples of a conventional one-ply, fabric reinforced conveyor belt construction were made using as the substrate the compounded polyurethane composition of Example II and a single layer or ply of Monoply Usflex (trademark--Uniroyal, Inc.) Polyester 220p fabric as the tension member. The fabric was sandwiched between two layers of the substrate with a final thickness of about 0.50 inch.

For the preparation of the foregoing, the ingredients specified in Example II were mixed with rapid mechanical stirring and the final mixture was degassed under vacuum for three minutes. A single ply of the polyester fabric (220p) measuring 12"×12" was placed in the bottom of a 12"×12"×0.25" open top mold and enough of the compounded polyurethane composition of Example II was poured on top of the fabric to fill the mold completely. The whole assembly was then cured for 10 minutes at 300° F. in a hydraulic press using contact pressure, and the molded sample removed from the mold. The mold was then filled completely with additional Example II compound and the molded sample placed on top with the fabric facing down and in contact with the liquid polyurethane composition. The whole assembly was then cured for 10 minutes at 300° F. using light contact pressure. This procedure produced a 12"×12" molded sample of conveyor-type construction approximately 0.50 inch in thickness with a single ply of polyester fabric located between two layers of the cured, flexible polyurethane substrate. Four test specimens, each 6 inches long and ½ an inch in width were cut from the belt-type sample; two were cut in a direction parallel to the warp yarns and two were cut in a direction parallel to the fill yarns. The test specimens were then tested following the procedure of the Bureau of Mines "Flame Test of Conveyor Belting and Hose;" Section 18.65 of Part 18 of Title 30—Code of Federal Regulations, Chapter I. Following the procedure of Example II, footnote (4), the blue Bunsen flame, 3 inches in height, was applied to the free end of each test specimen for one minute in still air before withdrawal of said flame.

The burning time for the 4 test specimens ranged from a minimum of 5 seconds to a maximum of 20 seconds, placing the construction into the self-extinguishing category. Most important, none of the specimens exhibited any dripping of charred substrate.

What is claimed is:

1. A flame-retarded composition comprising a chain extendable crosslinkable polyurethane prepolymer and
    (a) about 10 to about 50 parts by weight per 100 parts by weight of polyurethane of an organic additive selected from the group consisting of chlorine-substituted and bromine-substituted aliphatic, aromatic, alicyclic and mixed hydrocarbyl compounds having a halogen content in the range of about 35 to about 80 weight percent and optionally containing oxygen substituents in the form of hydroxyl, anhydride, ether, ester or amide groups and which are substantially non-volatile, stable and non-reactive toward said polyurethane and any auxiliary ingredients of said composition at the curing temperature of said polyurethane, and mixtures thereof;
    (b) about 1 to about 10 parts by weight per 100 parts by weight of polyurethane of a metallic compound selected from the group consisting of the antimony oxides, sulfides of antimony, antimony salts of the alkali metals of Group I of the Periodic Table, antimony salts of organic acids and their pentavalent derivatives, esters of antimonius acids and their pentavalent derivatives, cyclic antimonites, the oxides of arsenic and the oxides of bismuth; and
    (c) about 3 to about 40 parts by weight per 100 parts by weight of polyurethane to a $C_1$ to $C_5$ hexaalkoxymethyl melamine.

2. The composition of claim 1 in which said organic additive is a cycloaliphatic chloride.

3. The composition of claim 1 in which said organic additive is a chlorinated paraffin.

4. The composition of claim 1 in which said organic additive is 2,2',3,3',4,4',5,5',7,7,7',7'-dodecachloro-1,1',2,2',5,5',6,6'-octahydro-2,5,2',5'-dimethanobiphenyl.

5. The composition of claim 1 in which said organic additive is 6-(1',4',5',6',7',7'-hexachloronorborn-5'-en-2'yl)-1,2,3,4,10,10-hexachloro-1,4,4a,5,6,7,8,8a-octahydro-1,4:5,8-dimethanonaphthalene.

6. The composition of claim 1 in which said metallic compound is antimony trioxide.

7. The composition of claim 1 in which said melamine is hexamethoxymethylmelamine.

8. The composition of claim 1 which has been chain-extended and cross-linked by reacting the polyurethane prepolymer with a polyisocyanate.

9. The composition of claim 8 wherein the polyisocyanate is toluene diisocyanate.

10. The composition of claim 8 in which said organic additive is a cycloaliphatic chloride.

11. The composition of claim 8 in which said organic additive is a chlorinated paraffin.

12. The composition of claim 8 in which said organic additive is 2,2',3,3',4,4',5,5',7,7,7',7'-dodecachloro-1,1',2,2',5,5',6,6'-octahydro-2,5,2',5'-dimethanobiphenyl.

13. The composition of claim 8 in which said organic additive is 6-(1',4',5',6',7',7'-hexachloronorborn-5'-en-2'yl)-1,2,3,4,10,10-hexachloro-1,4,4a,5,6,7,8,8a-octahydro-1,4:5,8-dimethanohaphthalene.

14. The composition of claim 8 in which said metallic compound is antimony trioxide.

15. The composition of claim 8 in which said melamine is hexamethoxymethylmelamine.

* * * * *